United States Patent

Koncsek

[11] Patent Number: 5,836,361
[45] Date of Patent: Nov. 17, 1998

[54] RELEASABLE FLUID HOSE LOADING ARM SYSTEM

[75] Inventor: Sandor Koncsek, Houston, Tex.

[73] Assignee: PGI International, Inc., Houston, Tex.

[21] Appl. No.: 903,033

[22] Filed: Jul. 29, 1997

Related U.S. Application Data

[60] Provisional application No. 60/022,963 Aug. 2, 1996.
[51] Int. Cl.$^6$ ....................................................... B67C 3/00
[52] U.S. Cl. ........................... 141/279; 141/387; 141/382; 141/388; 248/75; 137/615
[58] Field of Search ..................................... 141/279, 382, 141/387, 388; 137/165; 285/1, 304, 317; 248/75, 81, 324, 404, 408, 411

[56] References Cited

U.S. PATENT DOCUMENTS

| | | | |
|---|---|---|---|
| 508,066 | 11/1893 | Tilger et al. | 285/304 |
| 971,518 | 10/1910 | Bergens | 248/75 |
| 3,874,428 | 4/1975 | Golay | 141/95 |
| 4,093,003 | 6/1978 | Miller et al. | 141/279 |
| 4,411,290 | 10/1983 | Heath | 141/279 |
| 4,899,792 | 2/1990 | Podgers | 141/382 |
| 5,228,474 | 7/1993 | Nimberger | 137/614.04 |
| 5,320,133 | 6/1994 | Nimberger | 137/614.04 |

Primary Examiner—Robert M. Fetsuga
Assistant Examiner—Tuhn N. Nguyen
Attorney, Agent, or Firm—Browning Bushman

[57] ABSTRACT

A system 10 fluidly connects a bulkhead B to a portable transport using a flexible fill line or liquid hose LH. The system includes a coupling 12 for separating the liquid hose LH from the bulkhead B during an inadvertent pull-away. An arm 24 is pivotally supported by the bulkhead B, and a support plate 36 is supported at the upper end of the arm 24. A release disk 50 is normally supported by the plate 36, and in turn supports a saddle 42 for supporting the liquid hose LH. Three circumferentially spaced pins 38 function as retaining members to support a release disk 50 on the plate 36. The components thus function to prevent the discharge end of the hose from dropping onto the ground. During a pull-away, at least one of the coil springs 64 associated with each release pin is compressed, thereby releasing the disk 50 and allowing both the saddle 42 and the liquid hose LH to become disconnected from the arm 24. The continued pull-away then separates the coupling 12, thereby preventing fluid from escaping from the bulkhead.

20 Claims, 4 Drawing Sheets

RELEASABLE FLUID HOSE LOADING ARM SYSTEM

CROSS-REFERENCE TO RELATED APPLICATION

The application claims priority from Provisional Application No. 60/022,963 filed Aug. 2, 1996 entitled "RELEASABLE FLUID HOSE LOADING ARM SYSTEM".

FIELD OF THE INVENTION

The present invention relates to a system for safely and efficiently loading a vehicle with a fluid from a bulkhead, and for reliably disconnecting and sealing the flexible line from the bulkhead to a vehicle in the event of an inadvertent vehicle pull-away. More particularly, this invention relates to a releasable fluid hose loading arm system which is particularly well suited to normally support the hose off the ground while providing a disconnect in the event of an inadvertent pull-away of either a bobtail or transport load-out.

BACKGROUND OF THE INVENTION

Flow line systems used to load vehicles with potentially dangerous fluids, such as propane, liquid petroleum gas, or anhydrous ammonia, often include a separable connection for emergency interruption of the flexible flow line extending between a stationary bulkhead and a portable vessel. Occasionally a transport vehicle pulls away from a stationary bulkhead prior to disconnecting the flexible fill line, and the absence of a separable connection along the flexible flow line may cause a rupture at the bulkhead. The monetary loss of fluid from such a rupture is nominal compared to the risks commonly associated with the release of toxic vapors, to the environmental consequences of polluting the filling station site, and/or to the fire hazard associated with such a rupture.

U.S. Pat. Nos. 3,874,428 and 4,899,792 each disclose systems with valves designed to stop fluid flow from a disconnected connection. An improved flow disconnect system particularly well suited for interconnection between a bulkhead and the flexible hose which extends to a transport is the Tripod™ coupling manufactured by PGI International. This tripod coupling, which is disclosed in detail in U.S. Pat. Nos. 5,228,474 and 5,320,133, provides a reliable disconnection between the bulkhead and the flexible hose in the event of an inadvertent vehicle pull-away. The Tripod™ coupling may be incorporated into a loading system for various fluids, and is particularly well suited for use in an anhydrous ammonia and propane systems. In a propane system, a TP-4 Tripod™ coupling may be used for passing liquid from the bulkhead to the flexible hose, and a structurally smaller TP-1 Tripod™ coupling may be used for returning vapor from the transport to the bulkhead. The system may be used in propane operations to load at a rate of at least 350 gpm.

While the disconnect system as described above offers significant advantages over other disconnect systems, the system would be more widely accepted if the user did not have to lift the flexible hose to the filling port in the transport, and periodically clean grit from the transport discharge end of the hose. After safely filling one transport vehicle, the upstream end of the flexible hose remains connected to the Tripod™ coupling, and the discharge end is typically hung over the bulkhead for temporary storage until the next transport is loaded. Many times, however, the discharge end of the hose drops to the ground, and thus must be cleaned of dirt and grit by the next user before being inserted into the fill port of the transport. Both the flexible hose and particularly the discharge end of the hose tend to become worn over an extended period of time since the hose and discharge end are abraded by sliding across the ground. Since the flexible hose may be 20 feet or more in length and is generally filled with fluid, it is heavy and bulky for the worker to manually move the hose about as required for a transport filling operation. This manual exertion is frustrating to the worker, and may result in injury to the worker's back or muscles.

Prior art loading arms typically pass fluid to the transport using sections of rigid pipe which are interconnected by two or more swivel joints. These assemblies are expensive to manufacture and require high maintenance. The loading arm assembly itself is not provided with a breakaway mechanism. Pivoting of the rigid upstream pipe may be controlled by a spring which acts as a biasing member. One or more downstream rigid or flexible pipes are connected to the upstream pipe by one or more swivel joints.

The disadvantages of the prior art are overcome by the present invention, and an improved connection is hereinafter disclosed for filling a transport from a bulkhead. The connection of the present invention may be employed in various flow lines extending between a bulkhead and a portable transport, and is particularly well adapted for use at an anhydrous ammonia, liquid petroleum gas, or propane filling station.

SUMMARY OF THE INVENTION

An exemplary embodiment of the present invention may be used in conjunction with a standard bulkhead for loading a portable transport. One or more Tripod™ couplers or other disconnect couplings and corresponding flexible hoses extend from each coupler to the transport device. A loading arm assembly includes a support structurally interconnected with the bulkhead and an arm pivotally connected to the support by a hinge pin. The arm has a counterweight at its lower end, and a swivel pin at its upper end. A support plate is interconnected to the upper swivel which is normally interconnected with the plate by three circumferentially spaced pins. An eyebolt is connected to the release disk, and a hose saddle is supported at the lower end of the eyebolt.

The release disk includes an annular recess for receiving the ends of three circumferentially spaced pins. Each pin is biased by a coil spring for engagement with the release disk, and the biasing force may be varied by a spring adjustment. During normal operations, the three circumferentially spaced pins retain the disk and thus the hose saddle connected to the upper end of the arm, thereby maintaining the flexible hose in an elevated position and reducing abrasion on the discharge end of the hose. During a pull-away operation, the pull-away force is transmitted through the hose to cause the release disk to separate from the support plate, thereby allowing the hose saddle to drop from the arm. The pull-away operation will thereafter promptly cause the Tripod™ coupler to disengage, thereby terminating the flow of fluid from the bulkhead.

During normal operation, the user pulls the flexible hose toward the transport vehicle, and which tilts the arm downward slightly with respect to the bulkhead. When the flexible hose is pulled in a direction parallel to the bulkhead for a conventional loadout, the pulling force on the hose rotates the swivel pin with respect to the arm, thereby transmitting substantially equal force to each of the three pins to prevent } an inadvertent release of the disk. After the loadout operation is complete, the user may simply release the discharge end of the hose, thereby allowing the counterweight to raise the saddle to a position such that the discharge end of the hose is supported off the ground.

It is an object of the present invention to provide an improved assembly for reliably interconnecting a bulkhead with a transport, and for allowing separation of a flexible flow line from the bulkhead in the event of an inadvertent pull-away. It is a related object of the invention to provide a system which reduces wear on a flexible hose interconnecting a bulkhead with a liquid transport, and more particularly for reducing wear on the discharge end of the hose without interfering with the reliable separation of the hose from the bulkhead in the event of an inadvertent pull-away.

Another object of the present invention is to reduce the cost and high maintenance associated with prior art loading arms by minimizing or eliminating the use of fluid swivel joints in the arm mechanism. Instead of utilizing swivel joints, the present invention utilizes a system for interconnecting the bulkhead and a portable transport wherein fluid is passed through a conventional flexible hose separate from the hose support mechanism.

It is a feature of the invention that a release mechanism is provided at the upper end of the support arm for automatically releasing the flexible hose in the event of an inadvertent pull-away.

It is a feature of the present invention that the hose support may be reliably used on both conventional loadout vehicles and bobtail vehicles. It is another feature of the invention that the hose is normally supported off the ground so that it may be easily manipulated by the user for insertion into the fill port of the transport. The discharge end of the fill hose is not contaminated by grit and dirt, thereby facilitating the transportation of clean fluid.

It is a significant advantage of the invention that the versatility and acceptance of the disconnect coupling is improved by the hose support mechanism of the present invention.

These and further objects, features and advantages of the present invention will become apparent from the following detailed description, wherein reference is made to the figures in the accompanying drawings.

DETAILED DESCRIPTION OF PREFERRED EMBODIMENTS

The present invention provides an improved fill system which includes a separable coupling along a flexible line to transmit fluid between a bulkhead and a portable transport. The flexible line typically extends to a flow discharge nozzle, and is manipulated for insertion of the discharge nozzle into the fill port of a transport. The separable coupling is preferably mounted about a substantially vertical axis, and a horizontal force exerted on the flexible line will cause the coupling to pivot without separating the flexible line from the coupling. An excessive force transmitted to the coupling separates the flow line from the bulkhead. The coupling thus provides an emergency separation if the transport is inadvertently moved while the discharge nozzle at a terminal end of the flexible line remains connected to the transport.

Figure 1:
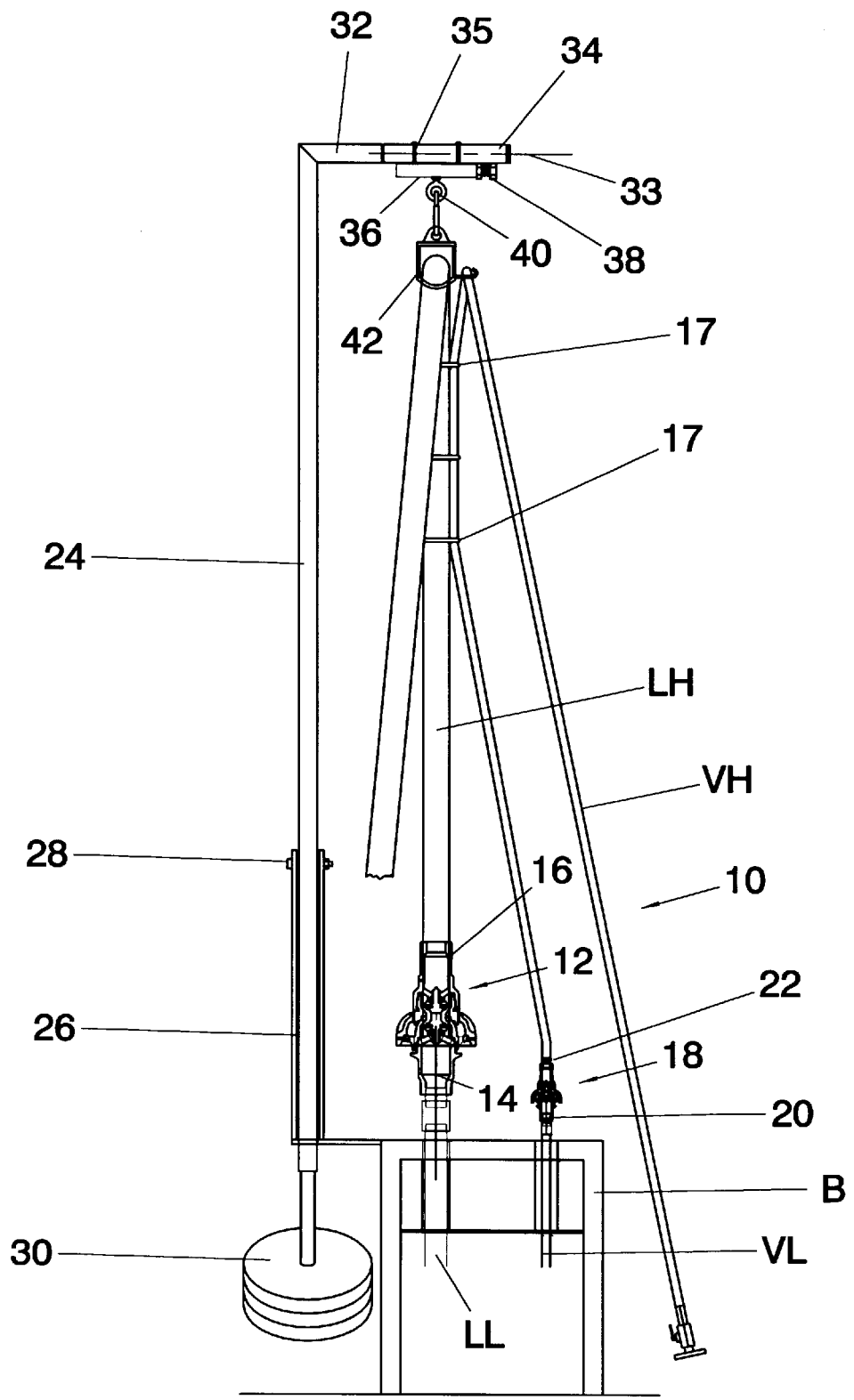
FIG. 1 is a front elevation view of a bulkhead with a pair of disconnect couplers and a hose support mechanism according to the present invention.

FIG. 1 depicts a system 10 according to the present invention for fluidly interconnecting a bulkhead B to a portable transport (not shown) using a flexible liquid hose LH, and for selectively separating the liquid hose LH from the bulkhead B during inadvertent pull-away of the transport. As explained more fully below, the transport may be a conventional loadout vehicle which will normally pull up to the bulkhead B and will normally leave the bulkhead B in a direction perpendicular to the FIG. 1 view. The transport may also be a bobtail truck which would normally backup to the bulkhead B and pull away from the bulkhead B in a direction to the right of the bulkhead as shown in FIG. 1. In either event, the system of the present invention is designed to separate the liquid hose LH from the bulkhead B in the event of an inadvertent pull-away with the liquid hose LH remaining attached to the transport, and during such a pull-away will seal liquid within the bulkhead B. In some applications, a single flexible fill line extends from the bulkhead B to the transport. In the system as shown in FIG. 1, however, two fluid flow lines extend from the bulkhead to the transport, namely liquid hose LH which transport propane from the bulkhead to the transport, and vapor hose VH which returns vapor from the transport to the bulkhead. Those skilled in the art will appreciate that the liquid line LL and the vapor line VL extend from the bulkhead to a suitable storage vessel which contains a large quantity of propane.

Both the liquid coupling 12 which interconnects the liquid line LL to the liquid hose LH and the vapor coupling 18 which interconnects the vapor hose VH to the vapor line VL may be Tripod™ couplings manufactured by PGI International, as more fully disclosed in U.S. Pat. Nos. 5,228,474 and 5,320,133 each incorporated by reference herein. The coupling 12 includes a lower ball housing 14 which is fixedly mounted on the bulkhead B, and an upper latch housing 16 which may pivot with respect to the ball housing 14 in any direction in response to movement by the liquid hose LH. Although preferably the ball housing is the housing fixed with respect to the bulkhead and the latch housing pivots with respect to the ball housing, in a alternate embodiment the latch housing is fixed to the bulkhead and the ball housing pivots thereon. As the user manipulates the liquid hose for interconnection of the liquid hose with the fill port (not shown) in the transport, the coupling 12 may pivot while maintaining a fluid tight connection between the bulkhead and the flexible hose LH. Similarly, coupling 18 includes a lower ball housing 20 which is stationary with respect to the bulkhead B, and an upper latch housing 22 which may pivot with respect to the ball housing. As shown in FIG. 1, at least a substantial portion of the vapor hose VH may be connected to the liquid hose LH using one or more conventional straps or ties 17. The discharge end of the liquid hose is provided with a hose end valve 19 for discharging liquid through the fill port in the transport. The vapor hose VH is conventionally inserted into a vapor release port in the transport and returns vapor from the transport back to the bulkhead and then to the storage vessel.

To prevent the discharge end of the liquid hose LH and the vapor hose VH from normally engaging the ground adjacent the bulkhead, the system 10 includes an elongate support arm 24 which is mounted on brace 26, which in turn is secured to the bulkhead B.

Figure 2:
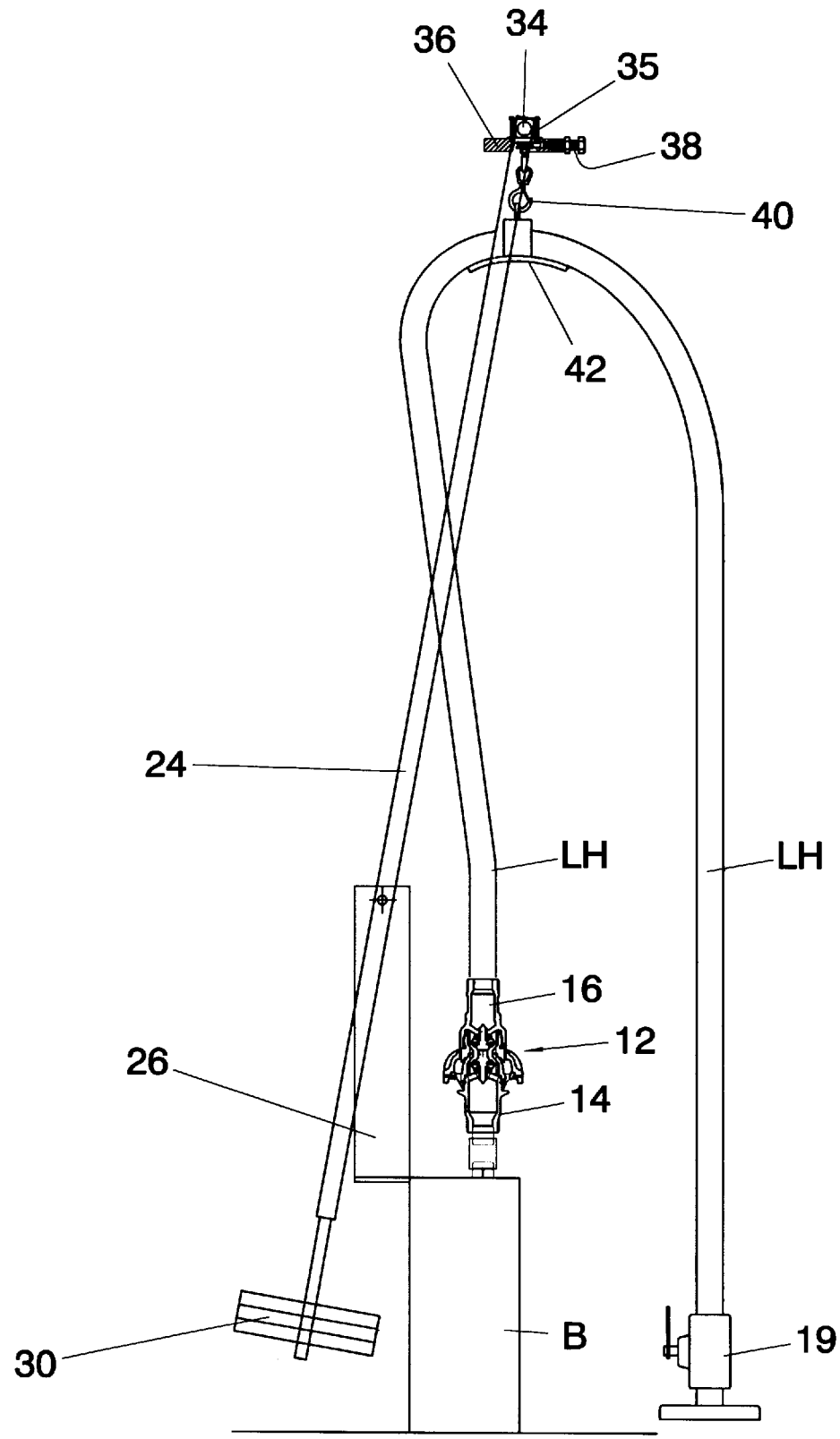
FIG. 2 is a side view of the bulkhead and hose support mechanism shown in FIG. 1.

Those skilled in the art will appreciate that the brace 26, as shown in FIGS. 1 and 2 may be welded, bolted, or otherwise secured to the bulkhead B. The support arm 24 may thus be structurally fixed to the bulkhead B by various techniques. The arm 24 is pivotable about hinge pin 28 mounted on the brace 26. When the flexible hoses are not being manipulated for interconnection with a transport, a counterweight 30 at the lower end of the arm 24 maintains the arm 24 in a generally vertical but slightly tilted position of, e.g., from 70° to 80°, thereby raising the hoses LH and VH off the ground. The weight of the hoses LH and VH is thus balanced by the counterweight 30 through support arm 26 which pivots about pin 28.

A short cantilever arm 32 is fixed to the upper end of the arm 24, and a swivel pin 34 is rotatably mounted on arm 32 such that it may rotate about axis 33. Swivel pin 34 may have various configurations, but for simplicity may consists of a tubular member which simply slides over a smaller diameter tubular arm 32, such that the outer tubular pin 34 may rotate about axis 33 on the inner tubular arm 32. Conventional stops (not shown) may be used to limit movement of swivel pin 34 along axis 33 with respect to the cantilevered tubular arm 32. A support member or plate 36 is structurally mounted to swivel pin 34 by conventional securing members such as bolts 35, and thus may similarly rotate about axis 33.

A release disk (not shown in FIGS. 1 and 2) is supported on the plate 36 by three circumferentially spaced retaining members or pins 38, and eyebolt arm 40 extends downward from the release disk. A hose saddle 42 in turn is supported from the eyebolt arm 40, and both the liquid hose LH and the vapor hose VH are supported on the saddle. Accordingly, both the liquid hose LH and the vapor hose VH normally extend generally upward from the couplings 12 and 18, are supported by the saddle 42, and then extend generally back downward toward the ground adjacent the bulkhead. The axial length of the arm 24 is thus selected so that the discharge end of the hoses are normally supported off the ground, as shown in FIGS. 1 and 2.

Figure 3:
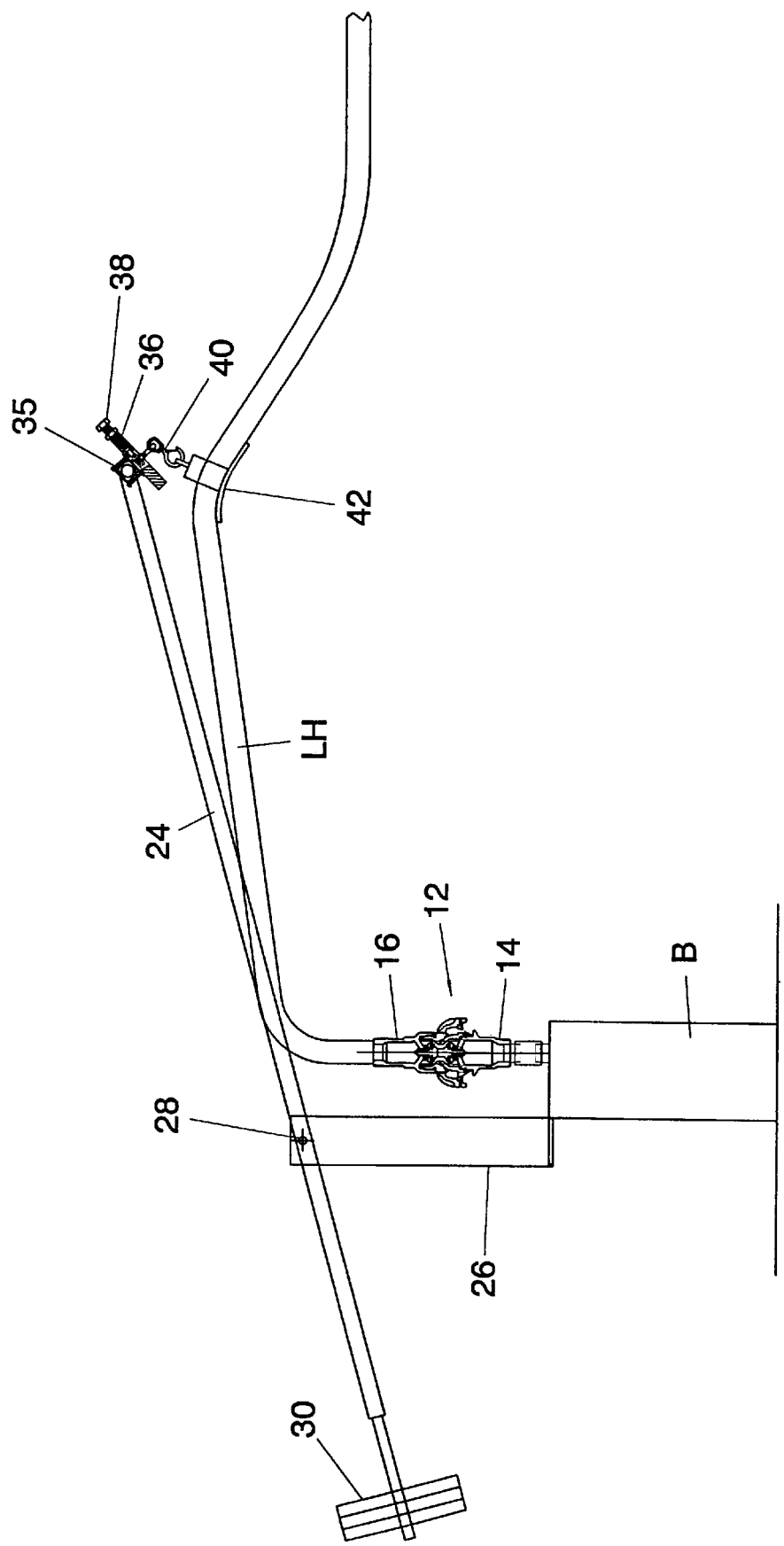
FIG. 3 is a side view of the assembly shown in FIG. 2, with the hose being moved for tilting the pivot arm with respect to the bulkhead.

Referring now to FIG. 3, a side view of the bulkhead shown in FIG. 2 is depicted, and but the liquid hose LH is pulled to the right such that the hose end valve 19 (not shown in FIG. 3) may be positioned within the fill port in the liquid transport. This manipulation of the hose pivots the arm 24 from the substantially vertical position as shown in FIG. 2, thereby raising the counterweight 30 off the ground and lowering the support plate 36. The pulling action on the liquid hose LH thus moves the support plate 36 and the saddle 42 to the right and downward compared to the FIG. 2 view, thereby allowing the discharge end of the liquid hose to be manipulated while still maintaining the hose supported off the ground. The vapor return hose VH is not shown in FIGS. 2 and 3, and for simplicity may be assumed to be positioned behind the liquid hose LH.

Figure 4:
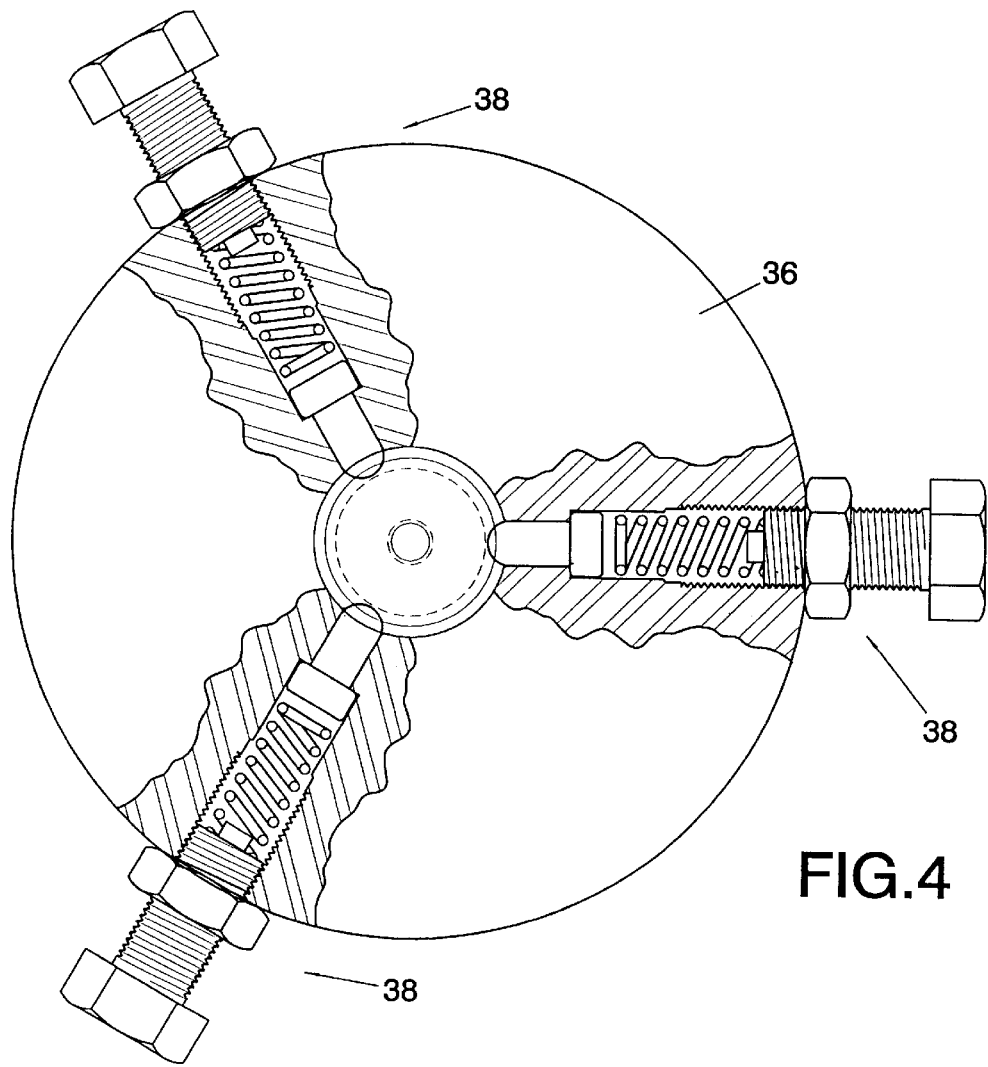
FIG. 4 is a top view of the support plate and pins generally shown in FIGS. 1–3.

FIG. 4 is a top view of the support plate 36. It may be seen that the generally circular plate 36 has three pins 38 circumferentially positioned about the plate 36 at equal circumferential spacings of 120°. Each pin 38 is preferably structurally identical. Those skilled in the art will understand that at least three such pins are preferably provided circumferentially spaced about the plate 36, and that additional pins equally spaced about the plate may be used, if desired.

Figure 5:
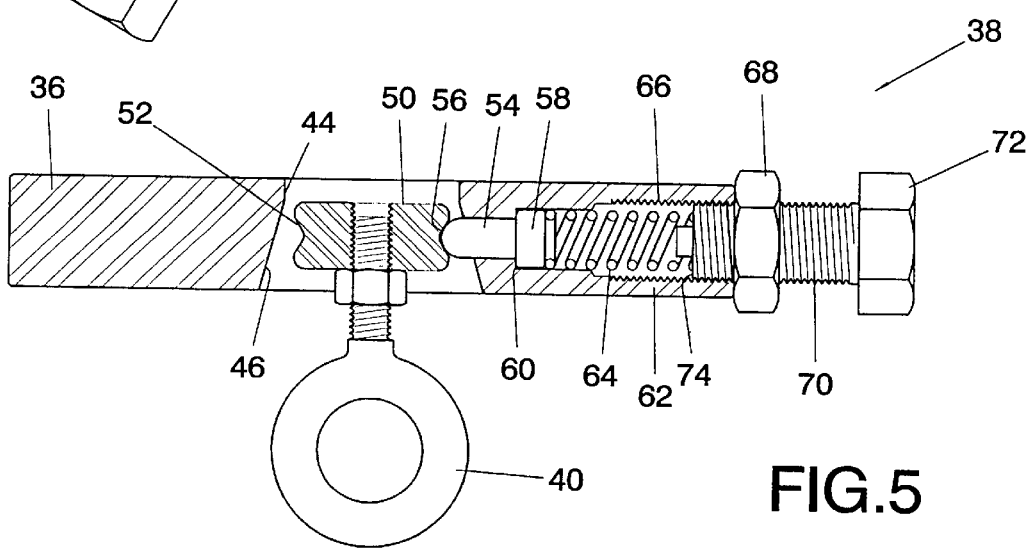
FIG. 5 is a cross-sectional view of a support plate and a pin for supporting the release disk.

FIG. 5 illustrates in cross-section the support plate 36, including a central port 44 therein having a lower frusto-conical sidewall 46 for receiving the release disk member or disk 50. Release disk 50 includes an annular groove 52 therein, and the eyebolt arm 40 is threaded to the release disk 50, as shown. Each pin includes a pin member 54 having a rounded tip 56 for fitting within the circumferential groove 52, and a head 58 for engagement with the stop surface 60 on the pin assembly body 62. Each pin 54 is biased toward the release disk by a suitable coil spring 64 positioned within cavity 66 in the body 62. A hex nut 68 is welded or otherwise secured to the body 62, and includes internal threads for receiving bolt 70. The head 72 of bolt 70 may thus be engaged with a conventional tool for rotating the bolt 70 to alter the axial position of bolt end surface 74, thereby changing the biasing force of the spring 64.

When the liquid hoses are not manipulated for transmitting fluid from the bulkhead to a transport, the assembly will be generally maintained as shown in FIGS. 1 and 2, with the liquid hose and the vapor hose discharge ends raised off the ground. When the discharge end of the hose is manipulated for filling a transport, the system 10 may pivot to the position such as generally shown in FIG. 3, with the saddle 42 still being supported by the pivot arm 24. During a pull-away situation, the pull-away force on the flexible hose is transmitted to the saddle 42 and thus the release disk 50, and this force tends to pivot the release disk 50 with respect to the support plate 36, thereby compressing one or more of the coiled spring 64, until one or more of the pin members 54 jump out of the groove 52, at which point the release disk 50 and thus the saddle 42 are automatically released from the upper end of the support arm 24. The continued pull-away action will transmit a force along the liquid hose and the vapor hose to the couplings, thereby separating the couplings 12 and 18 from the bulkhead B.

The action of the swivel pin 34 is important to achieve the objectives of the invention. Pivoting of the pin 34 during normal manipulation of the hose allows the plate 36 to rotate. Accordingly, manipulation of the hose during a filling operation does not cause the disk 50 to drop out of the support plate 36. By allowing the plate 36 to rotate with respect to cantilever arm 32, substantially equal pressure is exerted on each of the coil springs 64.

It is a significant feature of the invention that the elongate arm normally supports a flexible hose, and that fluid passes through a hose which is separate from the arm, thereby avoiding the use of costly swivel joints. Also, it is important that a release mechanism is provided at the upper end of the arm to release the hose during an independent pull-away. The particular release mechanism disclosed herein has three circumferentially spaced release pins. Those skilled in the art will appreciate that only two release pins could be used, and also that four or more release pins could be employed.

Various alternate embodiments will be suggested for the foregoing disclosure. For example, a counterweight as described herein may serve as a suitable biasing member for biasing the arm in a generally vertical position, although a spring, a hydraulic cylinder assembly, or other biasing member may be used. Less desirably, the biasing member could be the weight of the lower end of the arm, although this undesirably would cause an elevation of the pivot pin 28.

The foregoing description has been primarily directed to a preferred embodiment of the invention. It will be apparent to those skilled in the art that many other modifications and changes in the specifically described releasable fluid hose loading arm system may be made without departing from the scope and spirit of the invention. Therefore, the invention is not restricted to the preferred embodiments illustrated, and instead includes modifications which may fall within the scope of the following claims.

What is claimed is:

1. A system for fluidly interconnecting a bulkhead to a portable transport using a flexible fill hose and for selectively separating the fill hose from the bulkhead during a pull-away of the transport, comprising:

a coupling for structurally and fluidly interconnecting the bulkhead with the flexible hose, the coupling normally maintaining fluid communication between the bulkhead and the flexible hose and separating during a pull-away of the transport to seal fluid within the bulkhead;

an elongate arm pivotally mounted with respect to the bulkhead;

a support member secured to an upper end of the arm;

a release member normally supported by the support member;

a hose support supported from the release member for supporting the flexible hose; and a plurality of retaining members circumferentially spaced on the support member and each biased for engagement with the release member, such that the release member is normally supported by the support member at the upper end of the elongate arm, and during a pull-away the release member structurally separates from the support member.

2. The system as defined in claim 1, wherein the coupling seals fluid both within the bulkhead and within the flexible line when separating during a pull-away.

3. The system as defined in claim 2, wherein the coupling includes a lower end fixed with respect to the bulkhead and an upper end secured to the flexible line and pivotable with respect to the lower end.

4. The system as defined in claim 1, further comprising:

a swivel pin rotatable about the upper end of the arm for allowing rotation of the support member with respect to the arm.

5. The system as defined in claim 1, further comprising:

a biasing member for biasing the arm in the generally vertical position.

6. The system as defined in claim 1, wherein the plurality of retaining members include at least two circumferentially spaced biased release pins each normally engaging a recess in the release member.

7. The system as defined in claim 6, further comprising:

an adjustment member for adjusting the biasing engagement of the release pins on the release member.

8. The system as defined in claim 6, wherein each release pin is biased by a coil spring for engagement with the release member.

9. The system as defined in claim 1, wherein the release member includes a disk with an annular groove for receiving each of the retaining members.

10. The system as defined in claim 1, wherein the hose support includes an eyebolt interconnected with the release member and a hose saddle supported by the eyebolt for engagement with the flexible hose.

11. A system for fluidly interconnecting a bulkhead to a portable transport using a flexible fill hose, comprising:

a coupling for structurally and fluidly interconnecting the bulkhead with the flexible hose;

an elongate arm pivotally mounted with respect to the bulkhead;

a biasing member for biasing the arm in the generally vertical position;

a support plate secured to an upper end of the arm;

a release disk normally supported by the support plate;

a hose support supported from the release disk for supporting the flexible hose; and a plurality of retaining members for normally interconnecting the support plate and the release disk, such that the release disk is normally supported by the support plate at the upper end of the elongate arm, and during a pull-away the release disk structurally separates from the support plate.

12. The system as defined in claim 11, further comprising:

a swivel pin rotatable about the upper end of the arm for allowing rotation of the support plate with respect to the arm.

13. The system as defined in claim 11, wherein the biasing member is a counterweight secured to a lower end of the arm.

14. The system as defined in claim 11, further comprising:

the retaining members include at least two release pins each normally biased for engagement with the release disk.

15. The system as defined in claim 11, wherein the hose support includes an eyebolt interconnected with the release disk and a hose saddle supported to the eyebolt for engagement with the hose.

16. A method of fluidly interconnecting a bulkhead to a portable transport using a flexible fill hose, comprising:

structurally and fluidly coupling the flexible fill hose to the bulkhead;

pivotally mounting an elongate arm with respect to the bulkhead;

biasing the arm in the generally vertical position;

securing a support member to an upper end of the arm;

supporting a release member by the support member;

supporting a hose from the release member; and biasing a plurality of retaining members circumferentially spaced on the support member each for engagement with the release member, such that the release member is normally supported by the support member at the upper end of the elongate arm, and during a pull-away the release member structurally separates from the support member.

17. The method as defined in claim 16, further comprising:

rotatably mounting a swivel pin about the upper end of the arm for allowing rotation of the support member with respect to the arm.

18. The method as defined in claim 16, further comprising:

adjusting the biasing engagement of each release pin with the release member.

19. The method as define din claim 16, further comprising:

forming an annular groove in the release member for receiving each of the retaining members.

20. The method as defined in claim 16, further comprising:

supporting the hose support with an eyebolt interconnected with the release member and a hose saddle supported to the eyebolt.

* * * * *